Sept. 8, 1925.
A. E. OSBORN
1,553,101
CLUTCH OPERATING MECHANISM
Original Filed April 14, 1922
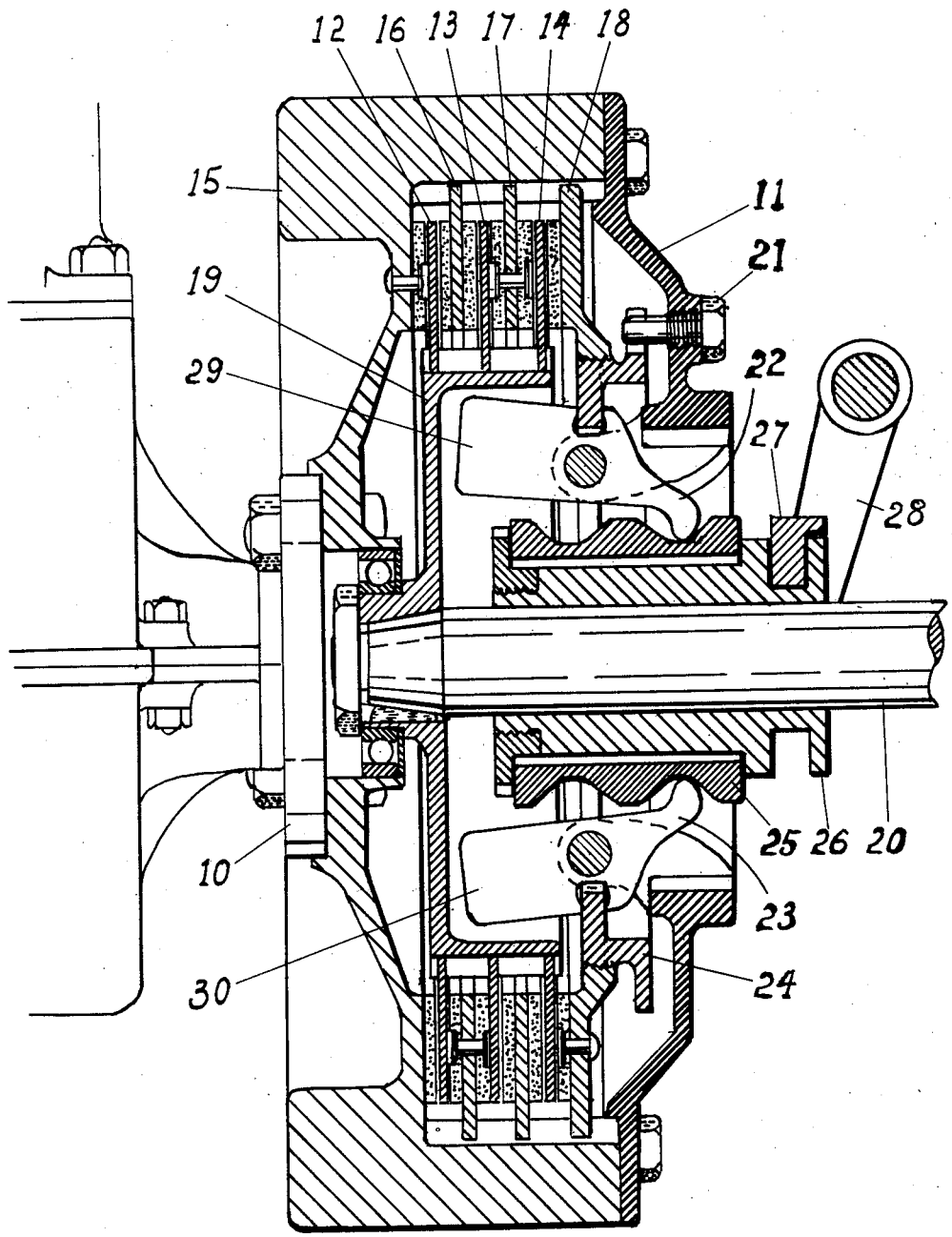
INVENTOR
Alden E. Osborn.

Patented Sept. 8, 1925.

UNITED STATES PATENT OFFICE.

ALDEN E. OSBORN, OF NEW YORK, N. Y.

CLUTCH-OPERATING MECHANISM.

Application filed April 14, 1922, Serial No. 552,496. Renewed April 20, 1925.

*To all whom it may concern:*

Be it known that I, ALDEN E. OSBORN, a citizen of the United States of America, and a resident of New York, county of the Bronx, and State of New York, have invented certain new and useful Improvements in a Clutch-Operating Mechanism, of which the following is a specification.

This invention relates particularly to improvements in the means for operating the clutch mechanism of a disc or other type of clutch in which the pressure is obtained by the longitudinal movement of one of the parts through the action of suitable clutch dogs which engage a cam or spool arranged to be moved into different positions by the operator. The principal feature consists of so arranging these clutch dogs that they will not be acted upon by centrifugal force through the rotation of the clutch and cause the clutch to drag at a time when it is desired to release the driven member. Another feature is the provision for these dogs to give an equal pressure on the longitudinally movable part of the clutch even though the parts are not accurately made.

In the accompanying drawing, I have for the purpose of disclosure, illustrated my invention in one form only, but would have it understood that it is susceptible of embodiment in other forms without departure from the true spirit and scope of the invention as defined in the appended claims.

In the drawing, 10 represents the driving element or engine crank shaft and 20 the driven element which is shown as a shaft adapted to be connected to the transmission gear when the clutch is used in connection with a motor vehicle. The driving element 10 is shown as provided with a fly-wheel or casing 15, which contains the clutch friction surfaces comprising the discs 16, 17, and 18 keyed to this casing 15 and the discs 12, 13, and 14 mounted on a drum 19 keyed to the driven member 20. The disc 18 is arranged to be given a longitudinal movement, in order to apply pressure to the friction surfaces by means of the clutch dogs 22 and 23 that are pivotally mounted on the cover 11 bolted to the fly-wheel 15 and act on the disc through the medium of the nut 24 which loosely engages suitable grooves in these clutch dogs. The clutch dogs 22 and 23 are in turn actuated by a cam collar or spool 25 which is slid longitudinally into different positions through the action of a sleeve 26, collar 27 and lever 28 which parts are arranged to be controlled by the operator in any suitable manner. The adjustment for wear on the friction surfaces is provided for by the nut 24 which is threaded into the disc 18 and retained in position by the cap screw 21 so that by removing this cap screw and turning the nut 24, the disc 18 can be adjusted, as desired, to take up wear on the parts. It should be understood, however, that the arrangement of the friction surfaces and method of adjusting the same for wear does not form part of my invention and that other types of construction may be used if desired. The clutch dogs 22 and 23 are provided, on the opposite side of their pivotal mountings on the cover 11, with suitable balance weights 29 and 30 which weights are designed to be thrown out by centrifugal force when the parts are revolving and not only relieve the parts of the pressure from the weight of the clutch dogs, but also draw the friction discs apart so that the drag of the discs would be eliminated when it is desired to release the clutch. This construction of the balance weights is the principal feature of my invention and may obviously be adapted to other forms of clutch mechanism. Another feature of my invention is that the cam collar 25 is arranged to be free to slide loosely on the sleeve 26 so that, in case the parts are not accurately made, it would be drawn to one side or the other and equalize the pressure on the parts when the clutch is engaged. This cam collar 25 is shown with three large diameter clutch engaging parts so that it would engage the clutch in three different positions. This, of course, is not essential to the operation of the mechanism and is shown because, when this type of clutch is used with certain forms of transmission gearing, it might be desirable to have the clutch engaged with several positions of the sleeve 26.

Having thus described my invention, I claim as new and desire to secure by Letters Patent.

1. In a clutch operating mechanism the combination of a driving element, a driven element, friction surfaces connected with the driving and driven elements, a pivotally mounted clutch dog to apply pressure to said friction surfaces, adjusting means between said clutch dog and said friction surfaces to take up wear on said friction surfaces, a cam acting on said clutch dog to apply pressure to said friction surfaces, and a centrifugal weight acting on the other side of the pivotal mounting of said clutch dog from said cam to relieve the pressure on said friction surfaces by the rotation of the clutch when said cam is withdrawn from its clutch engaging relation to said clutch dog.

2. In a clutch operating mechanism the combination of a driving element, a driven element, friction surfaces connected with the driving and driven elements, pivotally mounted clutch dogs to apply pressure to said friction surfaces, adjusting means between said clutch dogs and said friction surfaces to take up wear on said friction surfaces, a cam collar acting on said clutch dogs to apply pressure to said friction surfaces, and centrifugal weights acting on the other side of the pivotal mountings of said clutch dogs from said cam collar to relieve the pressure on said friction surfaces by the rotation of the clutch when said cam collar is withdrawn from its clutch engaging relation with said clutch dogs, and means for equalizing the pressure on said frictional surfaces comprising the mounting of said cam collar so that it can move freely across the plane of rotation of the clutch.

3. In a clutch operating mechanism the combination of a driving element, a driven element, friction surfaces connected with the driving and driven elements, a longitudinally movable member adapted to bring said friction surfaces into engagement, pivotally mounted clutch dogs adapted to give said member its friction surface engaging movement, a cam collar adapted to operate said clutch dogs by its longitudinal movement and mounted to move freely across the plane of rotation of said clutch mechanism to equalize the pressure on said clutch parts.

4. In a clutch operating mechanism, the combination of a driving element, a driven element, friction surfaces connected with the driving and driven elements, a longitudinally movable member adapted to bring said friction surfaces into engagement, pivotally mounted clutch dogs, to give said member its longitudinal movement, a cam collar adapted to operate said clutch dogs to engage said frictional surfaces by its longitudinal movement, controllable means for longitudinally moving said collar, and means for permitting the free movement of said collar across the plane of rotation of said clutch mechanism to equalize the pressure on the clutch parts.

In witness whereof, I have hereunto set my hand this 13th day of April, 1922.

ALDEN E. OSBORN.